(12) United States Patent
Klein et al.

(10) Patent No.: US 6,206,038 B1
(45) Date of Patent: Mar. 27, 2001

(54) MULTIWAY VALVE

(75) Inventors: Andreas Klein, Bad Homburg; Hans-Jörg Feigel, Rosbach, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/319,379

(22) PCT Filed: Nov. 13, 1997

(86) PCT No.: PCT/EP97/06339

§ 371 Date: Oct. 13, 1999

§ 102(e) Date: Oct. 13, 1999

(87) PCT Pub. No.: WO98/24669

PCT Pub. Date: Jun. 11, 1998

(30) Foreign Application Priority Data

Dec. 6, 1996 (DE) ................................. 196 50 591
Oct. 27, 1997 (DE) ................................. 197 47 307

(51) Int. Cl.$^7$ ................................. F15B 13/044
(52) U.S. Cl. ................................. 137/596.17; 137/625.26; 303/119.2
(58) Field of Search ................................. 137/596.17, 625.26, 137/625.49; 303/119.2

(56) References Cited

U.S. PATENT DOCUMENTS

| 3,665,353 | 5/1972 | Campbell . |
|---|---|---|
| 5,186,093 | 2/1993 | Kervagoret . |
| 5,191,827 | 3/1993 | Kervagoret . |
| 5,226,701 | 7/1993 | Lebret et al. . |
| 5,248,191 | 9/1993 | Kondo . |
| 5,410,943 | 5/1995 | Kervagoret . |

FOREIGN PATENT DOCUMENTS

| 11 78 310 | 9/1964 | (DE) . |
|---|---|---|
| 12 17 803 | 5/1966 | (DE) . |
| 42 21 757 | 1/1994 | (DE) . |
| 42 37 087 | 5/1994 | (DE) . |
| 43 39 694 | 5/1995 | (DE) . |
| 44 41 150 | 5/1996 | (DE) . |
| 0 369 412 | 5/1990 | (EP) . |
| 0 645 291 | 3/1995 | (EP) . |
| 92 05992 | 4/1992 | (WO) . |

*Primary Examiner*—Gerald A. Michalsky
(74) *Attorney, Agent, or Firm*—Rader, Fishman & Grauer PLLC

(57) ABSTRACT

This invention relates to a multidirectional valve, in particular for wheel-slip-controlled and/or automatic-brake-intervention-equipped hydraulic brake systems of automotive vehicles, which includes a seat valve member disposed axially movably within a valve housing as well as a valve slide movable relative to the seat valve member within the valve housing, with the valve slide connecting one or a plurality of pressure medium consumers (wheel brakes) alternatively to a pressure medium source (braking pressure generator) or to a pressure medium collector (low pressure reservoir) The valve slide is mechanically coupled with the seat valve member.

10 Claims, 1 Drawing Sheet

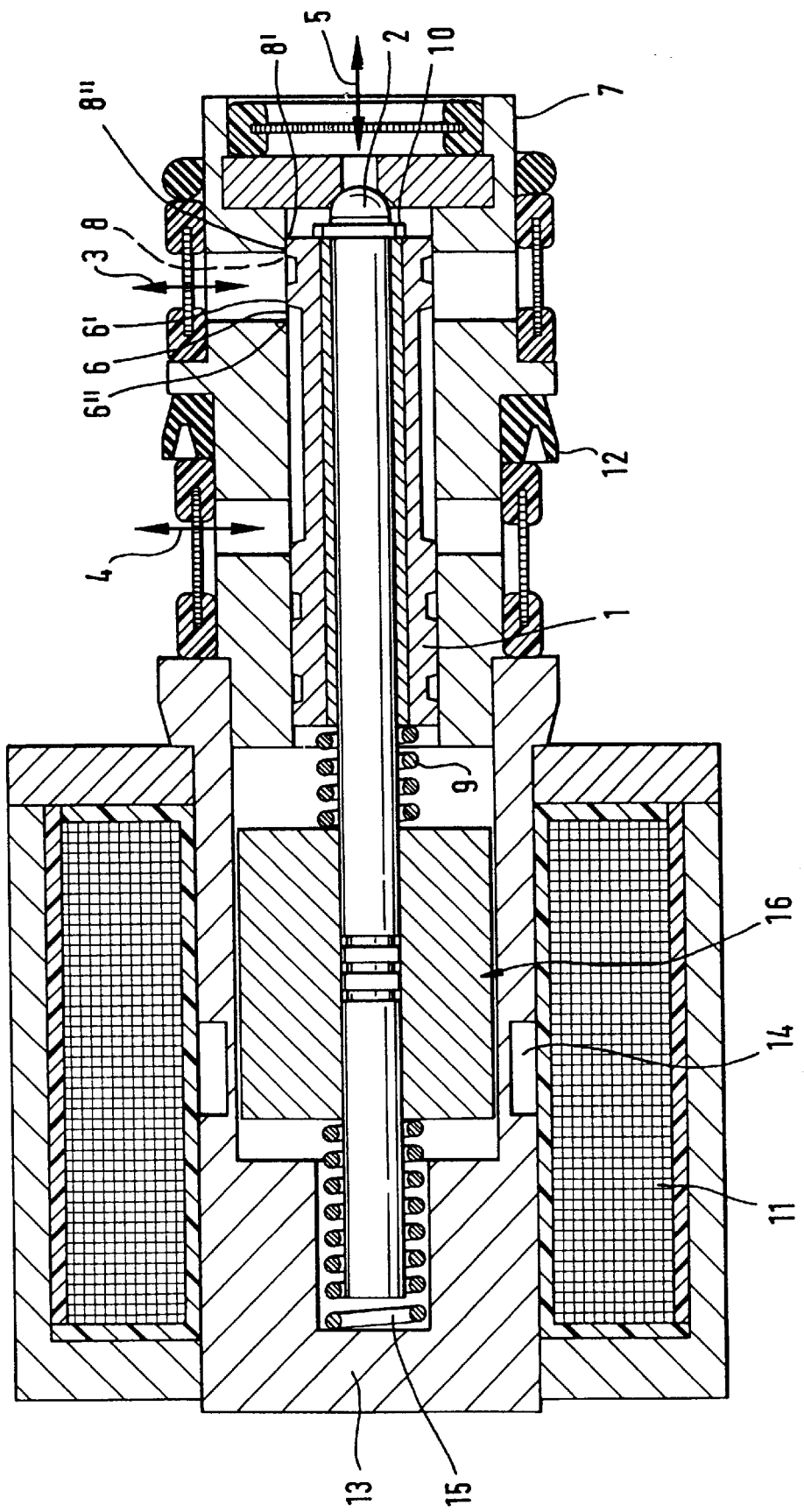

MULTIWAY VALVE

TECHNICAL FIELD

This invention relates to a multidirectional valve, in particular for wheel-slip-controlled and/or automatic-brake-intervention-equipped hydraulic brake systems of automotive vehicles.

BACKGROUND OF THE INVENTION

From DE 44 41 150 A1, a multidirectional valve has already come to knowledge which includes a valve seat member disposed axially movably within a valve housing as well as a valve slide movable relative to the valve seat member within the valve housing, with the valve slide connecting one or a plurality of pressure medium consumers alternatively to a pressure medium source or to a pressure medium collector. Owing to the fact that the valve slide is designed as a flow-type directional valve it is not pressure-compensated due to its working principle. Moreover its construction requires a lot of expenditure.

In the generic U.S. Pat. No. 5,248,191, the multidirectional valve of FIG. 1 includes a valve slide directly fastened to a magnet drive for controlling the pressure medium in a brake system. The valve slide end area, distal to the magnet drive, is abutted by a tappet cooperating with a spring-loaded seat valve member and establishing a mechanical coupling between the valve slide and the seat valve member. This leads to a line-up of the aforementioned components with a respective constructional length of the valve and with a long flow path towards the seat valve member. Activation of the magnet drive happens in accordance with the respective pressure control cycle and with the wheel brake pressure momentarily being active on the valve slide.

It is an object of this invention to design a multidirectional valve of the type referred to at the beginning so as to provide a multidirectional valve with as little structural and functional expenditure as possible, which will react fast, variably adjust the flow cross-section upon request and precisely meter out the pressure medium volume.

BRIEF DESCRIPTION OF THE DRAWING

FIG. 1 is a schematic view of the multidirectional valve of the present invention.

DETAILED DESCRIPTION OF THE PREFERRED EMBODIMENTS

The sole FIG. 1 is the schematical representation of a multidirectional valve which is particularly suited for being used with wheel-slip-controlled and/or automatic-brake-intervention-equipped hydraulic brake systems of automotive vehicles. The multidirectional valve includes a seat valve member 2 disposed axially movably within a valve housing 7 as well as a valve slide movable relative to the valve seat member 2 within the valve housing 7. The valve housing 7 is preferably constructed as a sleeve part wherein, likewise, the valve slide 1 is guided as a hollow slide. The seat valve member 2 includes a ball-type seat and is a one-piece component of a tappet which coaxially penetrates the valve slide 1. A proportional magnet 11 is disposed at the tappet end which is distal to the seat valve member 2. A valve plate is the counterpart of the seat valve member 2. This plate is fastened in the end section of the valve housing 7 and, towards a pressure medium collector 5, is followed by a plate filter. In the electromagnetically non-excited basic position, a compression spring (spring 15) fixed between an armature and the housing (sleeve 13) of the proportional magnet 11 will keep the seat valve member 2 in its closing position at the plate valve so that in the basic position of the valve according to the representation, due to the inventive mechanical coupling of seat valve member 2 and valve slide 1, an unhindered pressure medium communication of pressure medium consumer 3 with pressure medium source 4 will be established via a cutout of appropriate length and in the form of an annular groove on the periphery of the valve slide 1. To this end, the pressure medium connections of the pressure medium source 4 and of the pressure medium consumer 3 end as radial bores in the valve housing 7 which, on the periphery of the sleeve-shaped valve housing 7, are provided with annular filters. In the depicted basic position of the valve slide 1, herein, due to a first control edge 6' on the valve slide 1 and due to a neighbouring first control edge 6" in the valve housing 7 there exists a first throttle cross-section 6 which is variable in dependence on the stroke movement of the valve slide 1. This throttle cross-section 6 is situated in the area of the radial bore which leads to the pressure medium consumer 3 and is proximal to the pressure medium channel leading to the pressure medium collector 5 and closed by the seat valve member 2. The radial bore leading to the pressure medium source 4 thus is distal to the pressure medium ports which lead to the pressure medium consumer 3 and to the pressure medium collector 5 and is proximal to the section of the valve housing 7 which is connected with the proportional magnet 11. A second throttle cross-section 8, closed in the depicted Figure and provided for the purpose of hydraulic communication between the pressure medium consumer 3 and the pressure medium collector 5, will be opened after the valve slide 1 will previously have withdrawn from the plate seat valve or rather from the valve seat member, with the size of the throttle cross-section again being determined by a control edge 8' effective on the valve slide 1 and by another control edge 8" on the valve housing 7. The valve slide 1 is sealed within the valve housing 7 in dependence on the radial play of the valve slide 1 within the valve housing 7 by means of a clearance sealing effect of the present example of an embodiment. The depicted basic position of the valve slide 1 on an annular stop 10 on the seat valve member 2 is brought about by the action of the spring 15 and of a spring element 9 fixed between the armature and the valve slide 1.

By way of the second throttle cross-section 8 in the hydraulic connection, the inventive mechanical coupling of valve slide 1 and seat valve member 2 on the stop 10 automatically causes a serial connection of the seat valve member 2 between the pressure medium collector 5 and the pressure medium consumer 3 due to the abovementioned disposition of the pressure medium ports towards the pressure medium source 4, the pressure medium consumer 3 and the pressure medium collector 5.

The depicted multidirectional valve thus forms a slide valve which is steadily actuatable, e.g., by means of a proportional magnet, which is coupled with a seat valve and which expediently can be used for slip-controlled electro-hydraulic brake systems, with the valve slide 1 hydraulically connecting one or a plurality of wheel brakes acting as pressure medium consumers 3 alternatively to a braking pressure generator or auxiliary pressure supply system, respectively, acting as pressure medium source 4 or to a low-pressure accumulator or low-pressure reservoir, respectively, acting as pressure medium collector 5. The valve slide 1, preferably designed as hollow slide, is completely pressure-compensated in the pressure-medium control position and thus is perfectly suited with regard to as good a controlled delivery as possible of the pressure medium volume. It is advantageously possible to variably adjust the position of the valve slide 1 by means of an electromechanic drive. If required, it is possible to sense the position of the valve slide 1 electronically and to adjust it by means of an electronic controlling means. The suggested multidirectional valve, moreover, is advantageously characterised by the relatively short hydraulic connection between the second throttle cross-section 8 and the seat valve and does not require any flow through the pressure-compensated valve slide 1. As an alternative to the ball-type sealing-seat construction, of course, a cone seat may also be used. If wished for or if required, it is also expediently possible to replace the clearance sealing of the valve slide 1 in the valve housing 7 by a contact seal. The tappet-shaped extension on the seat valve member 2 simultaneously forms a sealing member which is connected with the armature by means of positive/frictional engagement. Further, a non-return collar 12 is provided on the outside periphery of the valve housing 7 between the two filter-equipped ports of pressure medium source 4 and pressure medium consumer 3. The multidirectional valve being used for a brake system, this non-return collar will establish hydraulic communication between the wheel brake and the braking pressure generator independently of the position of the valve slide 1. In order to possibly achieve a linearisation of the characteristic line of the magnet drive, the one-piece sleeve 13 of the proportional magnet 11 connected with the valve housing 7 includes an annular groove 14 on its outside periphery. This groove 14 reduces the magnetic short-circuit. The one-piece magnet sleeve 13 includes a collar in the area of the point of connection with the valve housing 7. This collar is expediently used for fastening the multidirectional valve in a valve carrier housing.

In contrast with the illustration of FIG. 1, the introduced multidirectional valve is a particularly small-sized element, its construction measuring but a few millimetres, since, due to the relatively small actuating currents, the construction of the magnet drive may also be very small. This is possible because of the fact that the valve slide 1 is a pressure-compensated valve element, open when currentless in the basic position and, in accordance with the structural embodiment described above, combined with a valve element (seat valve member 2) closed in the basic position.

In the described multidirectional valve, the control position of the valve slide 1 is substantially influenced by the spring force of the spring 15 and by the magnetic force of the solenoid (magnet drive 16). As is known, in such a magnet drive 16, the magnetic force will increase superproportionally as the armature air gap diminishes. So as to ensure an analogous function of the magnet drive 16, the magnet drive 16 formed by the armature, the current coil and the magnetically passed magnet core (sleeve 13) will be proportionalised. This means that the magnetic flow lines are deviated so that, for any selected electric current of the magnet drive 16, there will each time be a proportional correlation between the armature air gap and the magnetic force. So as to be able to realise an increased magnetic force of the solenoid upon request it is necessary to adapt the size of the magnet drive 16. Such an increase in the magnetic force will already be required if transverse forces exist, leading to an undesired increase in the frictional forces on the moving valve parts in the valve housing 7 and in the sleeve 13. In order to keep the electric energy needs and the above-described deviation of the magnetic flow lines as small as possible during the operation of the proportional magnet 11 it is therefore suggested to not rate the spring 15 linearly as a helical spring, as in the symbolic representation, but rather to use a spring 15 with a progressive force-to-travel characteristic line. This will make the spring force increase superproportionally as the armature air gap is diminishing, thereby the magnet drive 16 no longer being in need of being proportionalised very strongly. Instead of a linear characteristic line variation, this magnet drive 16 is given an appropriate progressive characteristic line. The advantages consequently lie in the improved exploitation of the constructional space and electric current and in avoiding transverse forces which will be to the benefit of the positioning accuracy of valve slide 1.

The suggested multidirectional valve is particularly suited for being used with slip-controlled brake systems since, due to the flow cross-section which is variably adjustable by means of the valve slide 1, a fast initial braking action is achieved, on the one hand, and a precise controlled delivery of the pressure medium volume with wheel slip control, on the other hand. This is advantageously done by a combination of pulse width and pulse amplitude modulations, i.e., valve openings of varying size can be adjusted which, on principle, can be done by means of a balancing between the forces of the magnet and the spring. With regard to as marked a miniaturisation as possible of the multidirectional valve, however, a so-called positioning control circuit is suggested for the valve slide 1 whereby it is possible to detect and, thus, to control any undesired frictional forces and to identify the respective operating condition of the multidirectional valve. Further, the use of a positioning control circuit enables the speed for changing the valve opening cross-section to be preselected according to needs in order to prevent any valve noise caused by pressure gradient changes.

Because of the inventive mechanical coupling of the inlet- and outlet valve functions there advantageously results a high-precision controlled volume delivery of the pressure medium flow as well as an improved transitional behaviour, influenced by the selection of the control edge overlappings. With selecting progressive valve opening cross-sections, there will be achievable a considerable improvement in the control behaviour of the valve since the opening cross-sections will act like high-precision control notches.

Summing up, the following aspects thus prove to be of great advantage for the suggested multidirectional valve.

1. Safe sealing function due to ball-type seat valve.
2. Very good controllability of volume flow by means of mechanically coupled inlet and outlet control edges.
3. Reduction of electric energy and, hence, reduction of the required magnetic force due to the use of a pressure-compensated valve slide.
4. Minimal chance of clogging of the valve slide due to only short-time pressure differences on the control edges.
5. Interference-free pressure change possible within the valve.
6. No tranverse forces active on the valve slide.
7. No main flow through the valve slide.
8. Easy manufactureability of control edges.
9. Simple design and few parts.
10. Proportional force-to-travel characteristic line variation of the magnet.
11. Low-noise controlled delivery of pressure medium volume.

What is claimed is:

1. A multidirectional valve for hydraulic brake control applications comprising:

a seat valve member disposed axially movably within a valve housing, a valve slide movable within the valve housing and movable into a plurality of positions of which one said position is defined as a basic position, wherein the valve slide is adapted to connect at least one wheel-brake-side pressure medium consumers to a pressure medium source, wherein the valve slide is mechanically coupled with the seat valve member and wherein the valve slide is a hollow slide disposed movably relative to the seat valve member within the valve housing, wherein the valve slide is penetrated coaxially by a tappet which receives the seat valve member and which, on the seat valve member, includes a stop abutted by the valve slide under the action of a spring element and wherein the seat valve member is a one-piece component of the tappet.

2. A multidirectional valve as claimed in claim 1, wherein, in its basic position, the valve slide connects the pressure medium consumer with the pressure medium source whereas the seat valve member, in its basic position, separates a pressure medium collector from the pressure medium consumer as well as from the pressure medium source.

3. A multidirectional valve as claimed in claim 2, wherein the valve slide includes a pressure medium control position, wherein when said valve slide is in said pressure medium control position, there exists a clearance sealing between the pressure medium source and the pressure medium collector, with the clearance sealing being formed by the radial play between valve slide and valve housing.

4. A multidirectional valve as claimed in claim 2, wherein the valve slide is acted upon by the spring element and, indirectly, by a spring, which spring element positions the valve slide in the basic position which establishes pressure medium communication between the pressure medium source and the pressure medium consumer, in which basic position hydraulic communication between the pressure medium collector and the pressure medium consumer is locked.

5. A multidirectional valve as claimed in claim 4, wherein the seat valve member is serially connected to a second throttle cross-section in the hydraulic connection between the pressure medium collector and the pressure medium consumer, wherein the cross-section of the seat valve member is smaller than the cross-section of the valve slide.

6. A multidirectional valve as claimed in claim 1, wherein the valve slide is pressure-compensated in its pressure-medium control position.

7. A multidirectional valve as claimed in claim 1, further including a first throttle cross-section disposed in the hydraulic connection between the pressure medium source and the pressure medium consumer, wherein the throttle cross-section is confined by a first control edge on the valve slide and by a first control edge in the valve housing.

8. A multidirectional valve as claimed in claim 7, further including hydraulic connection between the pressure medium consumer and the pressure medium collector, a second throttle cross-section which, in dependence on the release of hydraulic communication between the pressure medium consumer and the pressure medium collector, moves with its control edge relative to another control edge in the valve housing away from the seat valve member in case of a translatory movement of the valve slide.

9. A multidirectional valve as claimed in claim 1, wherein in the basic position, the valve slide abuts the stop the seat valve member.

10. A multidirectional valve as claimed in claim 1, wherein the position of the valve slide can be changed by means of an electromechanic drive.

\* \* \* \* \*